United States Patent
Robinson et al.

(10) Patent No.: US 6,983,713 B1
(45) Date of Patent: Jan. 10, 2006

(54) POWERED WATERCRAFT

(75) Inventors: Charles W. Robinson, Santa Fe, NM (US); William F. Burns, III, San Diego, CA (US)

(73) Assignee: M Ship Co., LLC., San Diego, CA (US)

( * ) Notice: Subject to any disclaimer, the term of this patent is extended or adjusted under 35 U.S.C. 154(b) by 0 days.

(21) Appl. No.: 10/957,914

(22) Filed: Oct. 4, 2004

Related U.S. Application Data

(63) Continuation-in-part of application No. 10/625,135, filed on Jul. 23, 2003, now Pat. No. 6,868,798.

(51) Int. Cl.
*B63B 1/32* (2006.01)

(52) U.S. Cl. ............... 114/288; 114/291; 440/89 R
(58) Field of Classification Search ............ 114/67 A, 114/271, 288, 289, 290, 291; 440/89 R
See application file for complete search history.

(56) References Cited

U.S. PATENT DOCUMENTS

| | | | |
|---|---|---|---|
| 3,091,206 A | 5/1963 | Cale | |
| 3,316,874 A | 5/1967 | Canazzi | |
| 3,371,645 A * | 3/1968 | Ward .................... | 440/89 R |
| 3,455,267 A * | 7/1969 | Tucker ................... | 114/67 A |
| 4,231,314 A | 11/1980 | Peters | |
| 4,393,802 A * | 7/1983 | Rizzo ..................... | 114/67 A |
| 4,587,918 A | 5/1986 | Burg | |
| 4,649,851 A * | 3/1987 | April ..................... | 114/271 |
| 4,840,589 A * | 6/1989 | Breaux ................... | 440/89 R |
| 4,926,771 A | 5/1990 | Hull | |
| 4,989,534 A * | 2/1991 | Field ..................... | 114/289 |
| 5,505,644 A * | 4/1996 | Ousley et al. .......... | 440/89 R |
| 5,685,253 A | 11/1997 | Alexander, Jr. | |
| 5,980,343 A * | 11/1999 | Rolinski ................. | 440/89 R |
| 6,250,245 B1 * | 6/2001 | Robinson et al. ....... | 114/288 |
| 6,314,903 B2 * | 11/2001 | Robinson et al. ....... | 114/288 |
| 6,526,903 B2 * | 3/2003 | Robinson et al. ....... | 114/288 |

* cited by examiner

*Primary Examiner*—Lars A. Olson
(74) *Attorney, Agent, or Firm*—Loyal McKinley Hanson

(57) ABSTRACT

A watercraft with a propulsion engine includes at least one hull having an underside. A dual exhaust system includes a first exhaust conduit defining a first exhaust flow path leading to the underside (e.g., a step in a planing surface on the underside) and a second exhaust conduit defining a second exhaust flow path to atmosphere. One embodiment is self proportioning. In another embodiment, an onboard proportioning system varies first and second proportions of the exhaust flowing through respective ones of the first and second exhaust conduits according to exhaust back pressure. First and second valve mechanisms selectively restrict the first and second exhaust flow paths under computer or manual control according to pressure sensed by a back-pressure-sensing component in order to thereby direct the exhaust in desired proportions for enhanced operating characteristics and reduced thermal signature.

25 Claims, 14 Drawing Sheets

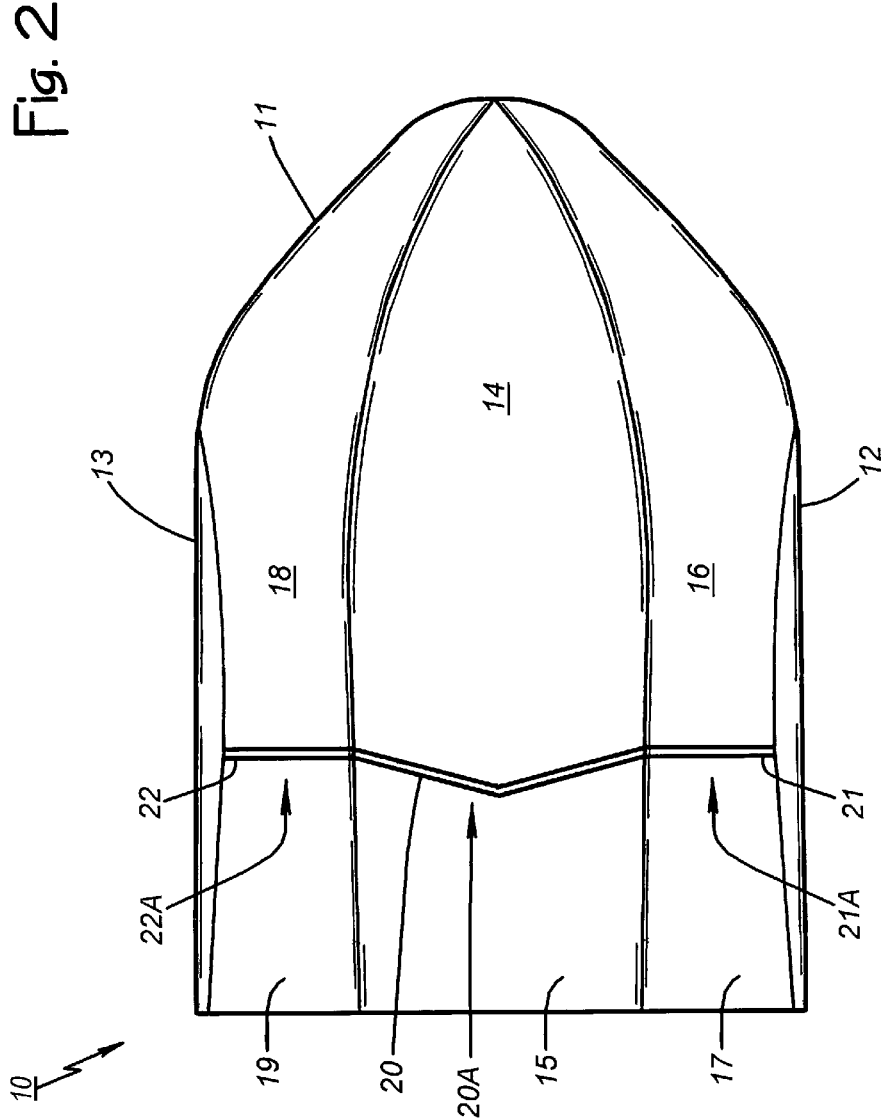

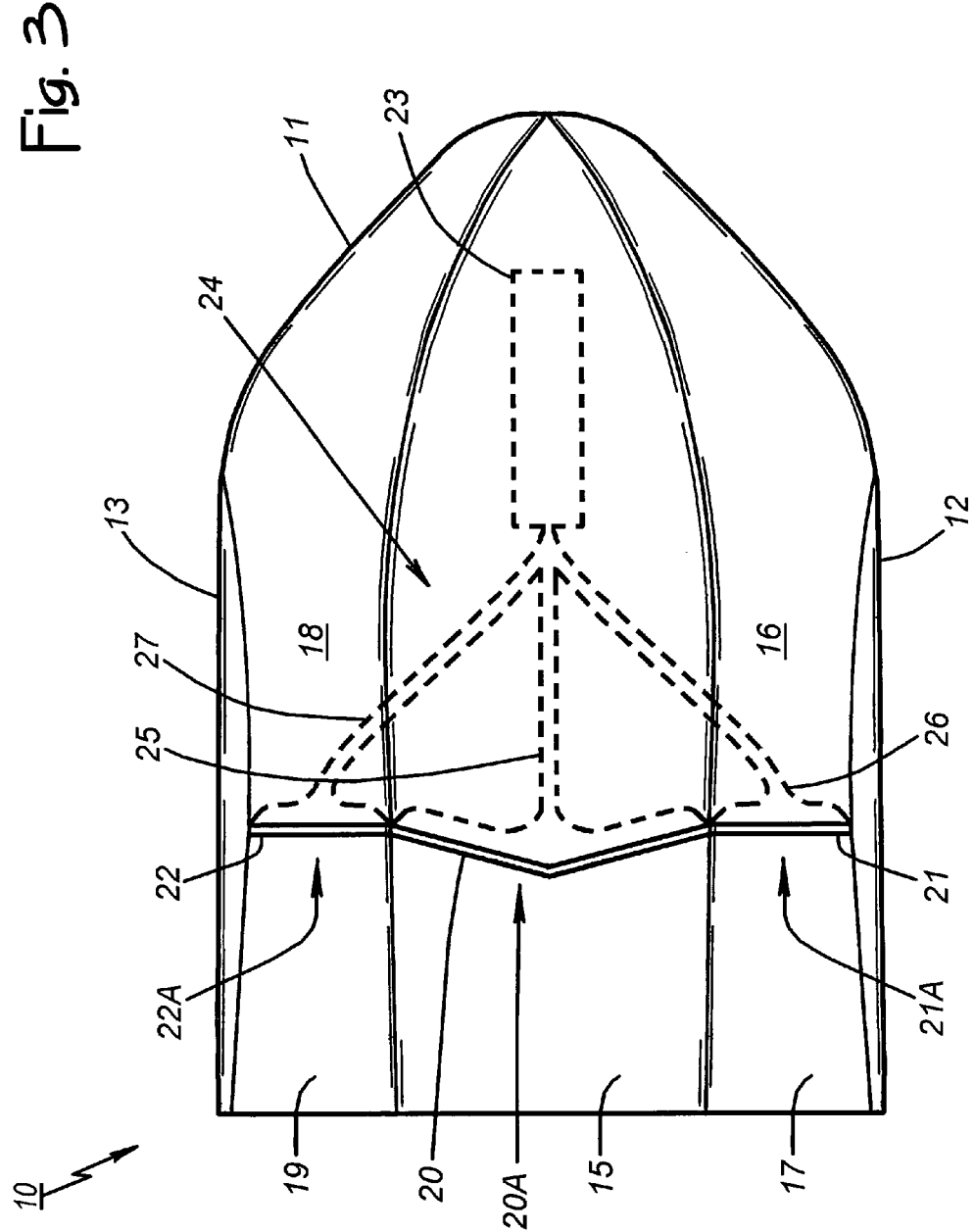

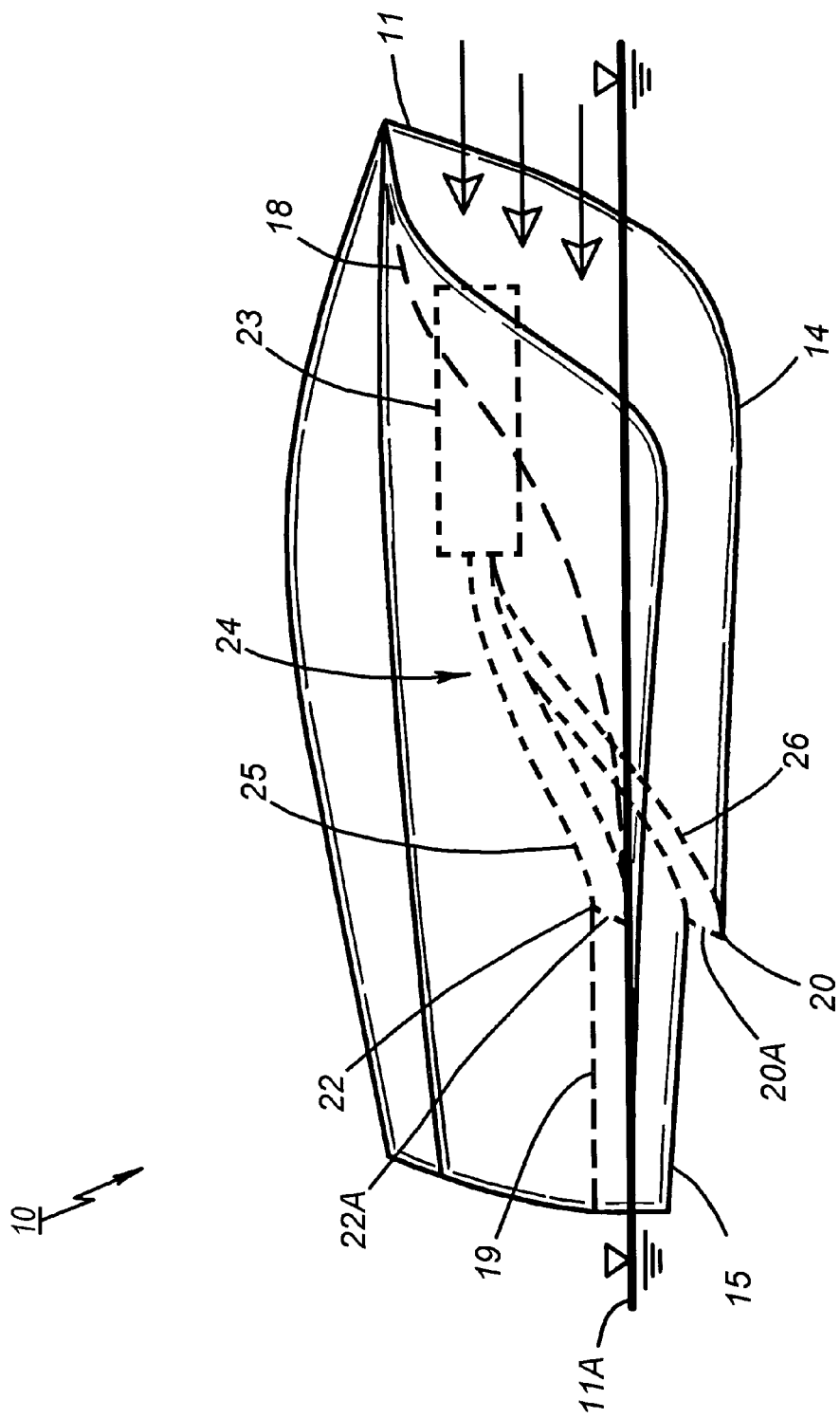

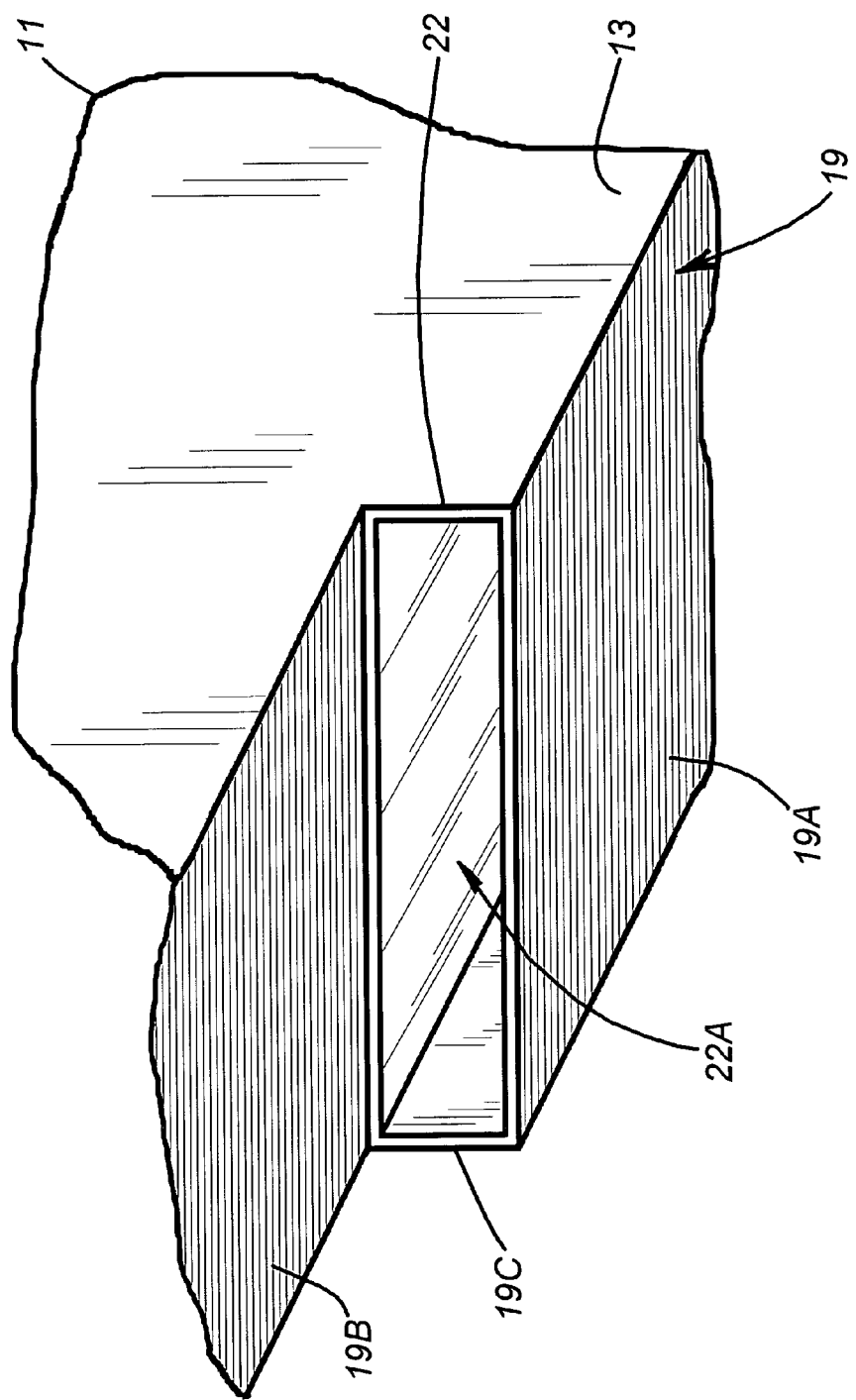

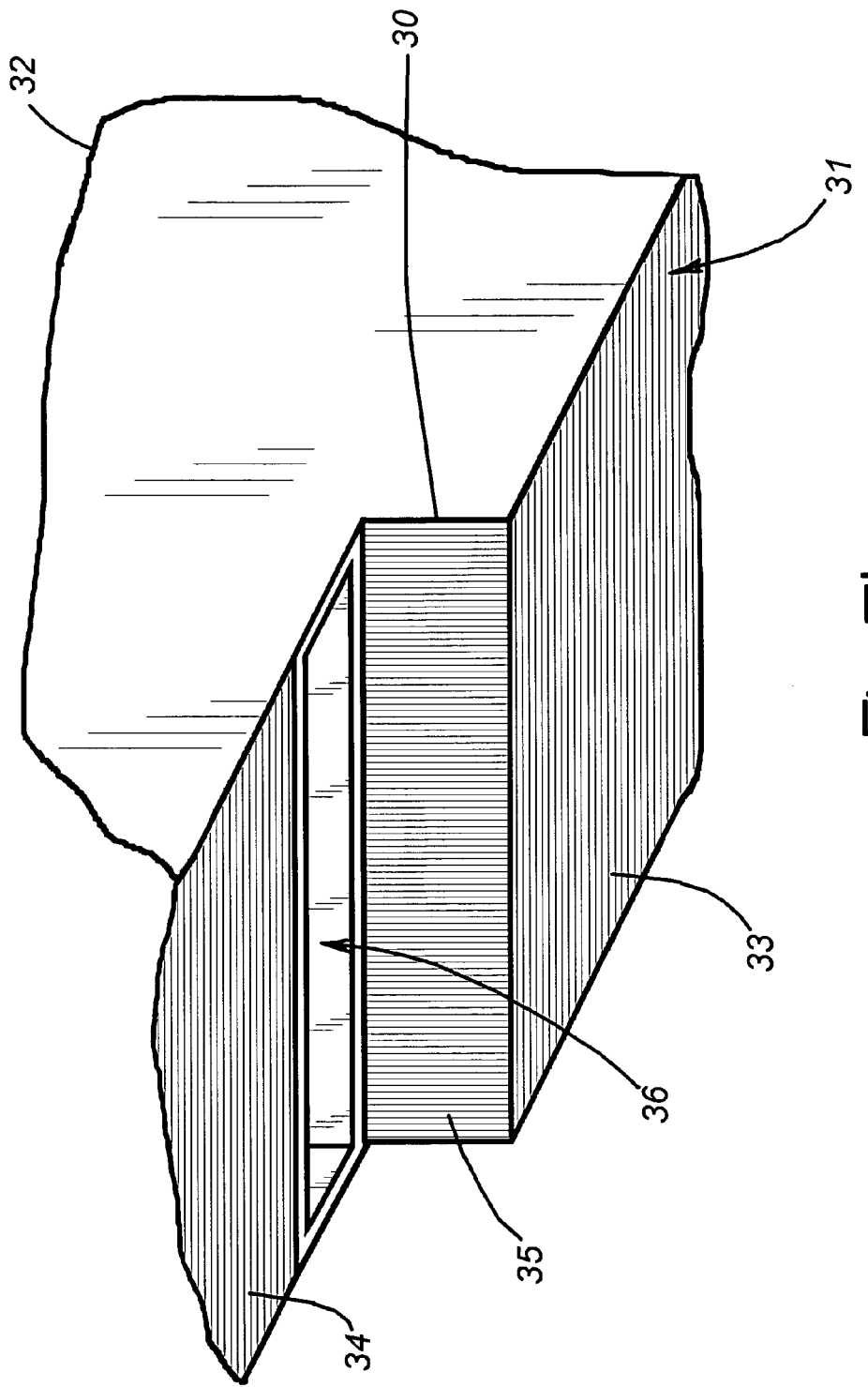

POWERED WATERCRAFT

CROSS REFERENCE TO RELATED APPLICATION

This application is a continuation in part of copending and commonly assigned U.S. patent application Ser. No. 10/625,135 filed Jul. 23, 2003 which issued as U.S. Pat. No. 6,868,798 on Mar. 22, 2005.

BACKGROUND OF THE INVENTION

1. Technical Field

This invention relates generally to powered watercraft, and more particularly to high speed powered watercraft having one or more hulls with an underside at which propulsion engine exhaust is vented.

2. Description of Related Art

Some existing boat hulls have an underside that forms a planing surface with a transverse step intermediate a bow portion and a stern portion of the hull. The step improves planing efficiency. When underway, however, a vacuum appears aft of the step as the water pulls away from the hull. So, in order to reduce the vacuum, some existing boats include vents to atmosphere at the step while others vent propulsion engine exhaust at the step.

Venting propulsion exhaust at the step according to existing techniques works with propulsion engines of limited size, but it does not lend itself to use with larger propulsion engines. A 7,000 horsepower gas turbine may, for example, be characterized by a mass flow of 43.5 pounds-per-second, an exhaust velocity of 100 to 200 feet-per-second, and a temperature on the order of 1,045 degrees Fahrenheit. Venting the exhaust from such a propulsion engine at a step in the hull can create unacceptable exhaust back pressure and unacceptable heating. Nevertheless, doing so promises significant advantages in the form of improved efficiency (i.e., reduced drag and increased lift) along with reduced thermal signature for military vessels. Thus, there exists a need for a way to vent propulsion engine exhaust from larger propulsion engines at a step in the hull.

SUMMARY OF THE INVENTION

This invention addresses the need outlined above by providing a watercraft with a dual exhaust and onboard exhaust proportioning system. The dual exhaust vents exhaust to the underside of the hull and to atmosphere while the exhaust proportioning system varies the proportion of total exhaust vented at each of those locations, preferably according to exhaust back pressure. Doing so maintains back pressure and heating at an acceptable level with improved efficiency and reduced thermal signature.

To paraphrase some of the more precise language appearing in the claims and further introduce the nomenclature used, a watercraft constructed according to the invention includes at least one hull and an onboard propulsion engine that produces exhaust. The hull has an underside (e.g., defining at least one planing surface and at least one vertical step in the planing surface). According to a major aspect of the invention, there is provided a dual exhaust arrangement. First exhaust venting means vents a first proportion of the exhaust at the underside (e.g., at the vertical step in the planing surface), the first venting means including a first exhaust conduit that defines a first exhaust flow path leading to the underside of the hull (e.g., to the vertical step in the planing surface). In addition, second exhaust venting means vents a second proportion of the exhaust to atmosphere, the second venting means including a second exhaust conduit that defines a second exhaust flow path leading to atmosphere.

Preferably, exhaust proportioning means are provided for varying the first and second proportions of the exhaust. In one embodiment, an onboard proportioning system (e.g., computerized and/or manually operated) varies the first and second proportions according to exhaust back pressure. First and second valve mechanisms selectively restrict the first and second exhaust flow paths according to back pressure sensed by a back-pressure-sensing component in order to direct the exhaust through the first and second flow paths in desired proportions. Thus, the invention provides an onboard system that enables venting of exhaust from larger propulsion engines at the underside of the hull (e.g., at a step in the underside of the hull) for improved efficiency (i.e., reduced drag and increased lift) along with reduced thermal signature for military vessels. The following illustrative drawings and detailed description make the foregoing and other objects, features, and advantages of the invention more apparent.

BRIEF DESCRIPTION OF THE DRAWINGS

FIG. 2 is a diagrammatic plan view of the underside of the first watercraft showing the extension of the vertical steps that covers the entire central displacement body and the planing channels;

FIG. 3 is a diagrammatic view of the first watercraft similar to FIG. 2 that shows the exhaust-venting system for directing propulsion engine exhaust into the vertical steps;

FIG. 4 is a starboard side elevation view of the first watercraft similar to FIG. 1 that includes the propulsion engine and the exhaust-venting system gas ducts leading into the vertical steps;

FIG. 5a is a diagram depicting an enlarged isometric view of a portion of the starboard side, the planing surface, and a vertical step of watercraft such that the exhaust-venting opening is located in the riser portion of the vertical step;

FIG. 5b is a diagram similar to FIG. 5a of an alternate exhaust-venting arrangement such that the exhaust-venting opening is located in the upper portion of the vertical step;

DESCRIPTION OF THE PREFERRED EMBODIMENTS

The description of the preferred embodiment begins with a Powered Watercraft With M-Shaped Hull section of this specification that restates some information presented in U.S. patent application Ser. No. 10/625,135 filed Jul. 23, 2003 (now U.S. Pat. No. 6,868,798). That background section describes watercraft having one or more planing surfaces and one or more steps in the planing surfaces at which exhaust is vented. Thereafter, information is presented in an Exhaust Proportioning System section that describes a dual exhaust system with means for controlling the proportions of exhaust vented at the steps in the planing surfaces and to atmosphere according to exhaust back pressure. A reader already familiar with the specification and FIGS. 1–9 of the above-identified patent application, may proceed directly to the additional information in the Exhaust Proportioning System section.

Figure 1:
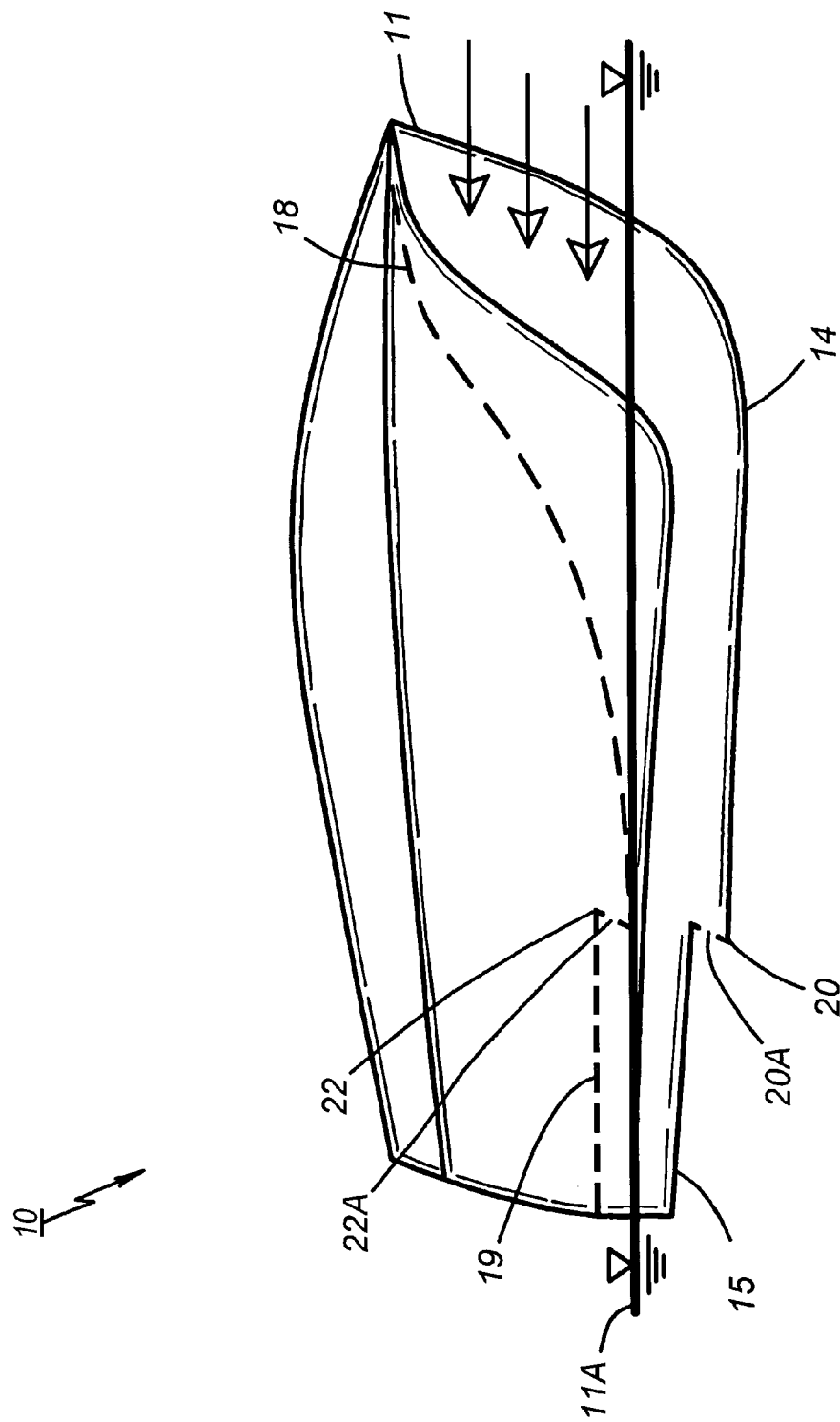
FIG. 1 of the drawings is a starboard side elevation view of a first watercraft that includes an M-shaped boat hull with vertical steps in the central displacement hull and the planing channels.

Powered Watercraft With M-Shaped Hull. FIGS. 1–4 of the drawings show various aspects of a powered watercraft 10. The watercraft 10 includes an M-shaped boat hull 11 having a port side 12 (FIGS. 2 and 3) and a starboard side 13 (FIGS. 1–4). The hull 11 includes a central displacement body 14 having a planing surface 15 (FIGS. 1–4), a port channel ceiling 16 having a planing surface 17, and a starboard channel ceiling 18 having a planing surface 19. FIGS. 1 and 4 include the static water line 11A and three arrows depicting the flow of air when the watercraft 10 is under way. Additional details of the M-shaped boat hull aspects of the watercraft 10 may be had by reference to U.S. Pat. Nos. 6,250,245; 6,314,903; and 6,526,903.

The watercraft 10 includes a first vertical step 20 (FIGS. 1–4) in the planing surface 15 of the central displacement body 14. The displacement body 14 portion of the hull 11 defines an exhaust-venting opening 20A at the first vertical step 20. The watercraft 10 also includes a second vertical step 21 in the planing surface 17 of the port channel ceiling 16 (FIGS. 2 and 3), and a third vertical step 22 in the planing surface 19 of the starboard channel ceiling 18 (FIGS. 1–4). The hull 11 defines a second exhaust-venting opening 21A at the second vertical step 21 (FIGS. 2 and 3) and a third exhaust-venting opening 22A at the third vertical step 22 (FIGS. 1–4). In that regard, the size of the vertical steps 20, 21, and 22 and the size of the exhaust-venting openings 20A, 21A, and 22A are not illustrated to scale. They are exaggerated for illustrated purposes in order to better identify them in the drawings.

An onboard propulsion engine 23 (FIGS. 3 and 4) powers the watercraft 10. It may take any of various known forms, including diesel, gas turbine, and jet engines, and it produces exhaust and surplus air that is conveyed by an exhaust-venting system 24 to the exhaust-venting openings 20A, 21A, and 22A. The exhaust-venting system 24 extends from the engine 23 to the exhaust-venting openings 20A, 21A, and 22A. It includes first, second, and third exhaust manifold branches 25, 26, and 27, each of which conveys exhaust from the engine 23 (e.g., via triangularly shaped ducts) to a respective one of the first, second, and third exhaust-venting openings 20A, 21A, and 22A. Stated another way, the exhaust-venting system 24 functions as means for venting exhaust from the onboard propulsion engine 23 at the vertical steps 20, 21, and 22 in the planing surfaces 15, 17, and 19 while under way in order to introduce gas along the planing surfaces. The high temperature of pressurized exhaust gas results in a film of high pressure gas along the planing surfaces 15, 17, and 19 that further reduces the friction drag for increased performance and efficiency.

FIGS. 5a and 5b are diagrams that show further details of the exhaust-venting opening configuration. First consider FIG. 5a. It depicts an enlarged perspective view (not to scale) of the third vertical step 22 in the planing surface 19 adjacent the starboard side 13 of the hull 11. The vertical step 22 includes a forwardly disposed lower portion 19A at a first planing surface level of the planing surface 19 and a rearwardly disposed upper portion 19B at a second planing surface level of the planing surface 19 that is elevated relative to the first planing surface level by the height of a riser portion 19C of the third vertical step 22. The riser portion 19C defines the exhaust-venting opening 22A so that the exhaust-venting opening 22A faces rearwardly. In other words, the hull 11 defines an exhaust-venting opening 22A intermediate the upper and lower portions 19A and 19B that faces rearwardly from the vertical step 22. This is a preferred orientation.

FIG. 5b illustrates that other opening orientations may be employed. It depicts an enlarged perspective view of a vertical step 30 in a planing surface 31 of a hull 32. The vertical step 30 is similar in some respects to the third vertical step 22 illustrated in FIG. 5a in that it includes a forwardly disposed lower portion 33 at a first planing surface level of the planing surface 31 and a rearwardly disposed upper portion 34 at a second planing surface level of the planing surface 31 that is elevated relative to the first planing surface level by the height of a riser portion 35 of the vertical step 30. The major difference is that the upper portion 34 defines an exhaust-venting opening 36 that faces downwardly, with exhaust being vented through it downwardly. In other words, the hull 32 defines an exhaust-venting opening 36 in the upper portion 34 that faces downwardly from the upper portion 36.

Figure 6:
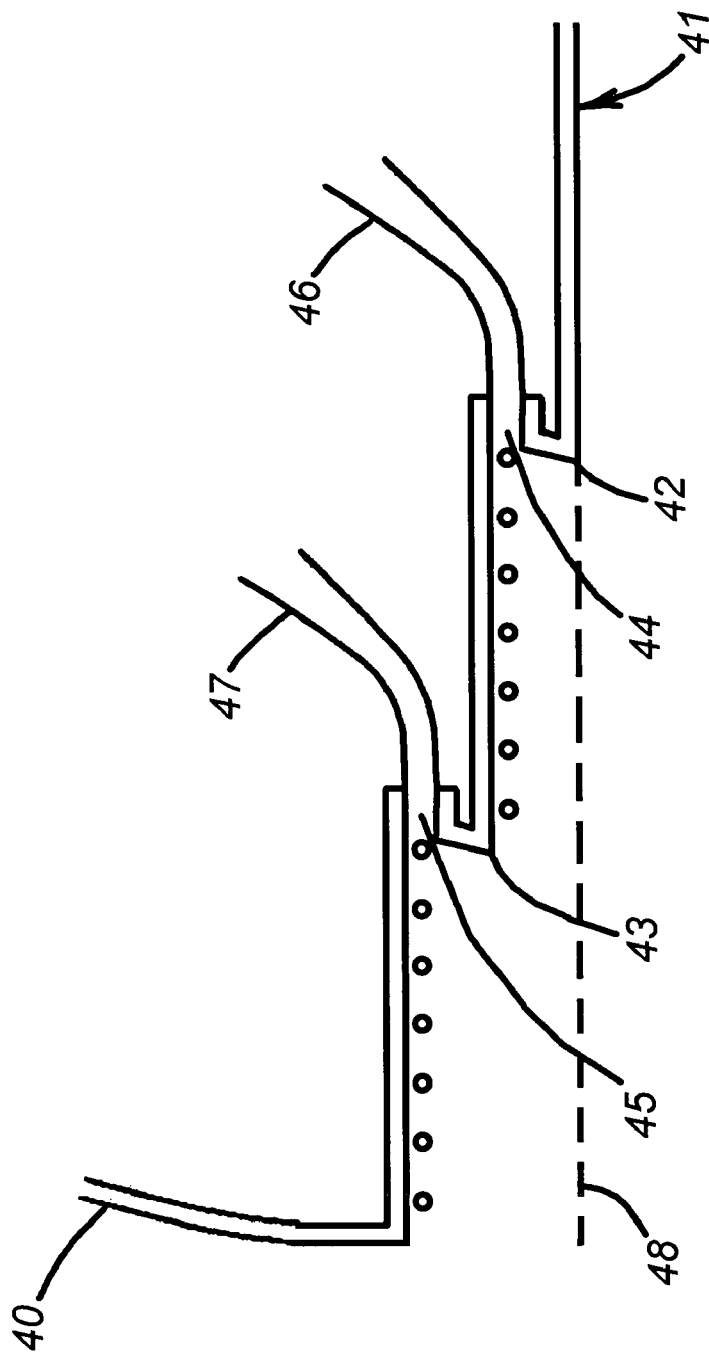
FIG. 6 is a diagrammatic starboard side elevation view of portions of a second watercraft that includes multiple vertical steps and an accompanying exhaust-venting system such that the planing level is raised at each step progressively.

Turning now to FIG. 6, it shows a portion of a hull 40 that illustrates one type of vertical step configuration. The hull 40 represents the hull of any powered watercraft. It has a planing surface 41, a forwardly disposed first vertical step 42 and a rearwardly disposed second vertical step 43. The hull 40 defines first and second exhaust-venting openings 44 and 45 through which exhaust manifold branches 46 and 47 vent exhaust. The small circles in FIG. 6 represent exhaust and surplus air venting through the exhaust-venting openings 44 and 45. In this vertical step configuration, the planing level is raised at each of the first and second vertical steps 42 and 43 progressively from an original planing level identified by the broken line at reference numeral 48.

Figure 7:
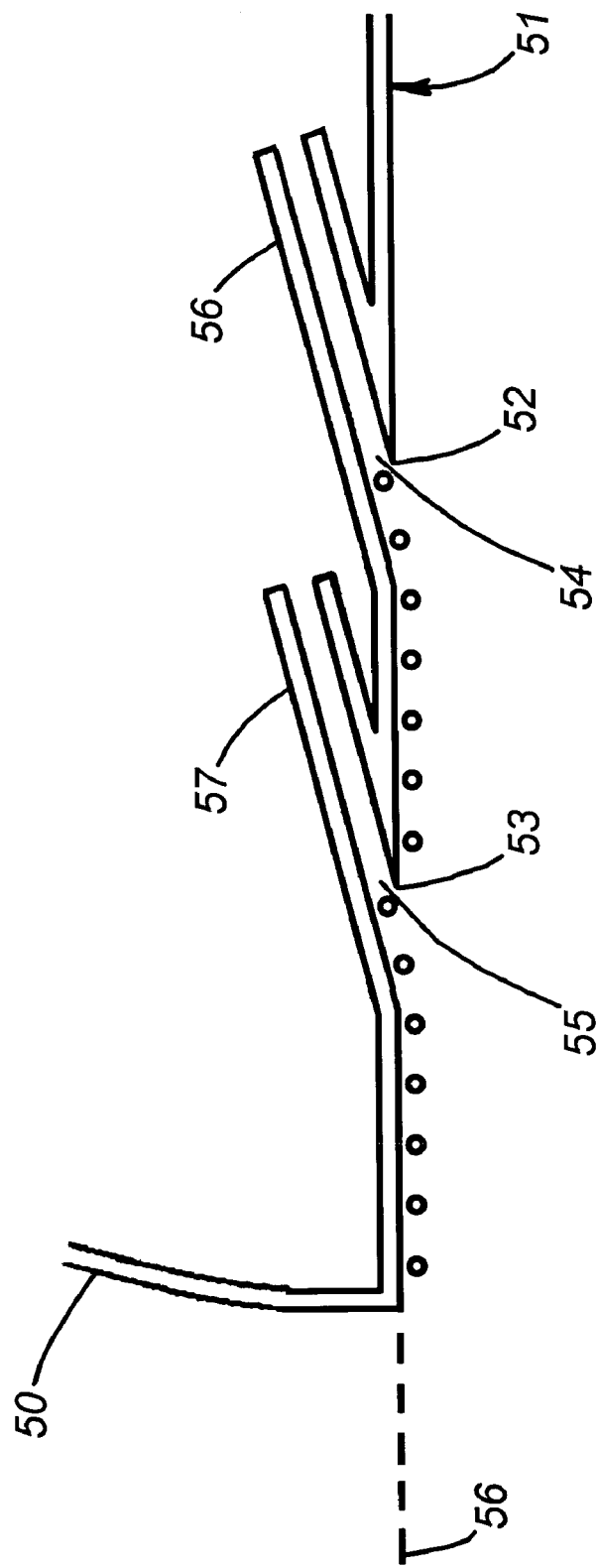
FIG. 7 is a diagrammatic starboard side elevation view of portions of a third watercraft that includes multiple vertical steps and an accompanying exhaust-venting system such that the planing level retracts after each step to the original planing surface.

FIG. 7 shows a portion of a hull 50 that illustrates another type of vertical step configuration. The hull 50 has a planing surface 51, a forwardly disposed first vertical step 52 and a rearwardly disposed second vertical step 53. The hull 50 defines first and second exhaust-venting openings 54 and 55 through which exhaust manifold branches 56 and 57 vent exhaust. The small circles represent exhaust and surplus air venting through the exhaust-venting openings 54 and 55. In this vertical step configuration, the planing level 51 raises at each of the first and second vertical steps 52 and 53 from an original planing level identified by the broken line at reference numeral 58, only to quickly return to the original planing level.

Figure 8:
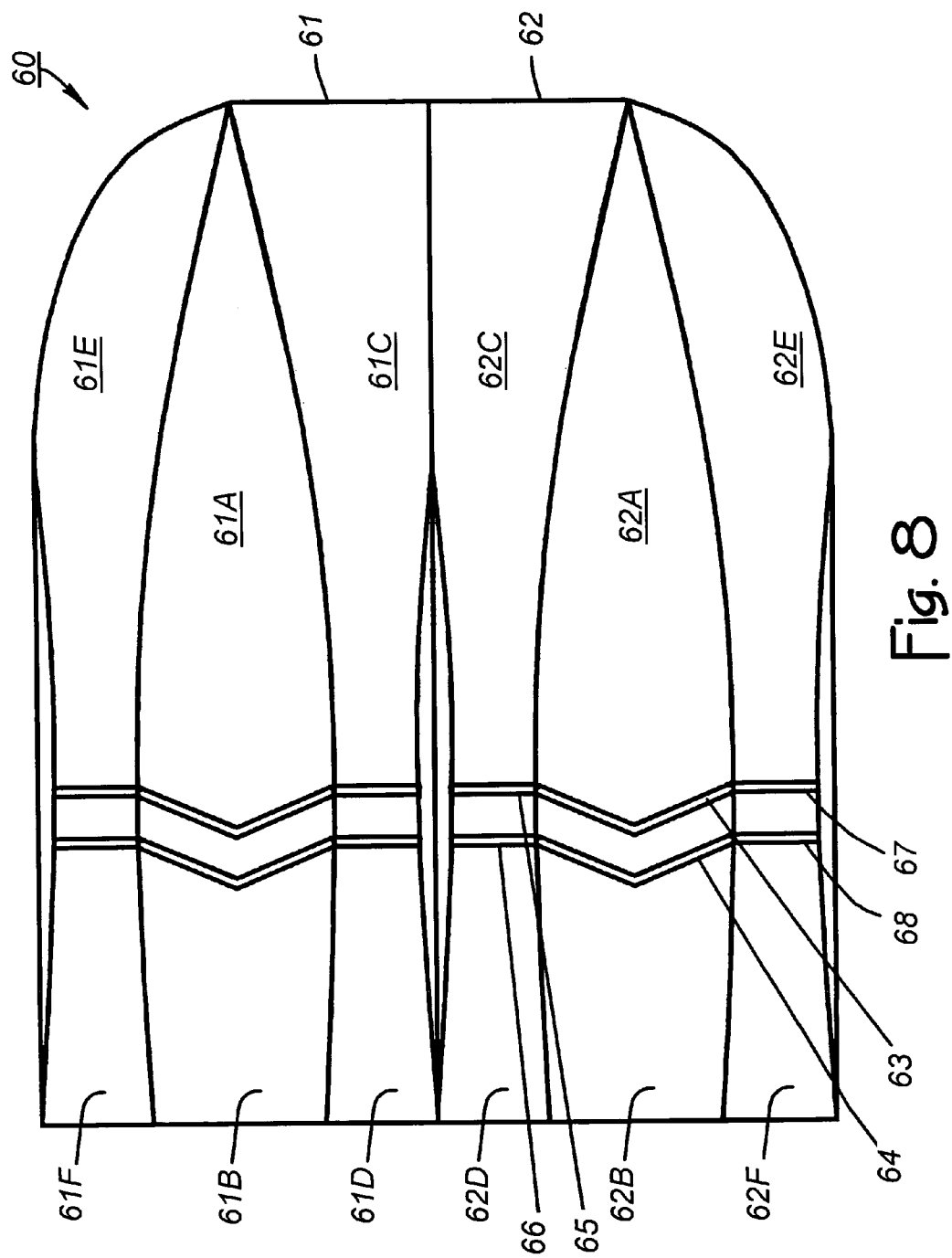
FIG. 8 is a diagrammatic plan view similar to FIG. 2 of the underside of a fourth watercraft having multiple hulls and multiple vertical steps in each hull.
Figure 9:
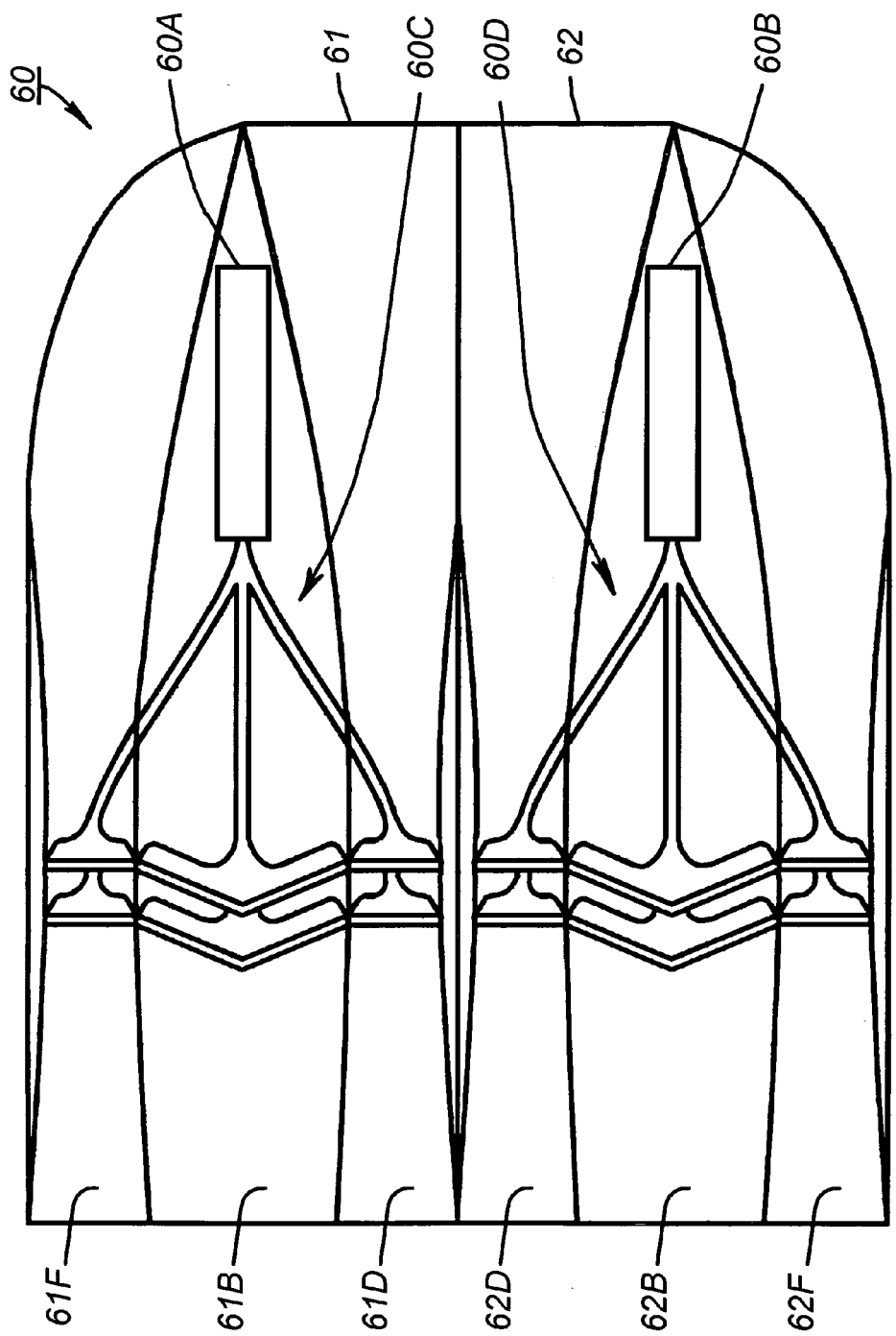
FIG. 9 is a diagrammatic plan view of the fourth watercraft that includes the exhaust-venting system for directing propulsion engine exhaust into the vertical steps.

FIG. 8 is a diagram depicting the underside of a multiple hull watercraft 60 constructed according to the invention. It includes a first hull 61 and a second hull 62. The first hull 61 includes a central displacement body 61A with a planing surface 61B, an inwardly disposed first channel ceiling 61C with a planing surface 61D, and an outwardly disposed second channel ceiling 61E with a planing surface 61F. Similarly, the second hull 62 includes a central displacement body 62A with a planing surface 62B, an inwardly disposed first channel ceiling 62C with a planing surface 62D, and an outwardly disposed second channel ceiling 62E with a planing surface 62F. Each planing surface includes two vertical steps arranged in line to span the width of the planing multiple surfaces. Just the six vertical steps 63, 64, 65, 66, 67, 68 are identified for the three planing surfaces 62B, 62D, and 62F of the second hull 62 for illustrative convenience. FIG. 9 shows the watercraft 60 with first and second propulsion engines 60A and 60B connected to the vertical steps via first and second exhaust-venting systems 60C and 60D.

Thus, the powered watercraft embodiments described above include means for venting propulsion engine exhaust at one or more vertical steps in one or more planing surfaces on the watercraft. Doing so introduces gas along the planing surface (preferably high temperature gas) that significantly improves performance and efficiency. That technique is shown applied to watercraft with single or multiple M-shaped boat hulls that include single or multiple vertical steps in each planing surface. In that regard, the term "M-shaped boat hull" herein refers to a boat hull that falls within the scope of one or more of the claims in U.S. Pat. Nos. 6,250,245; 6,314,903; and 6,526,903. Those patents are incorporated herein by reference for all of the details they provide.

Figure 10:
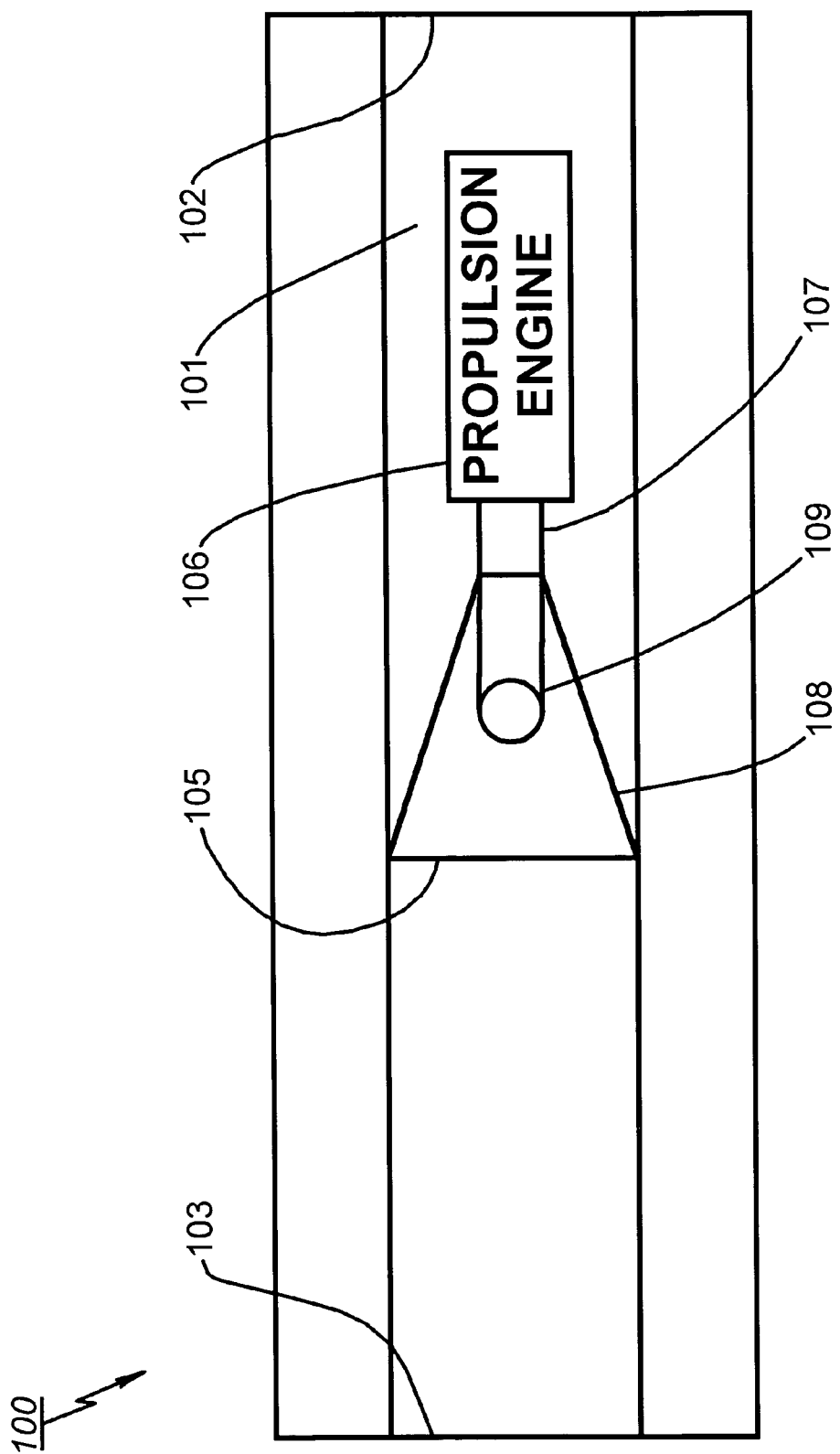
FIG. 10 is a diagrammatic plan view of a fifth watercraft that includes proportional sea and air exhaust ducting according to the invention.
Figure 11:
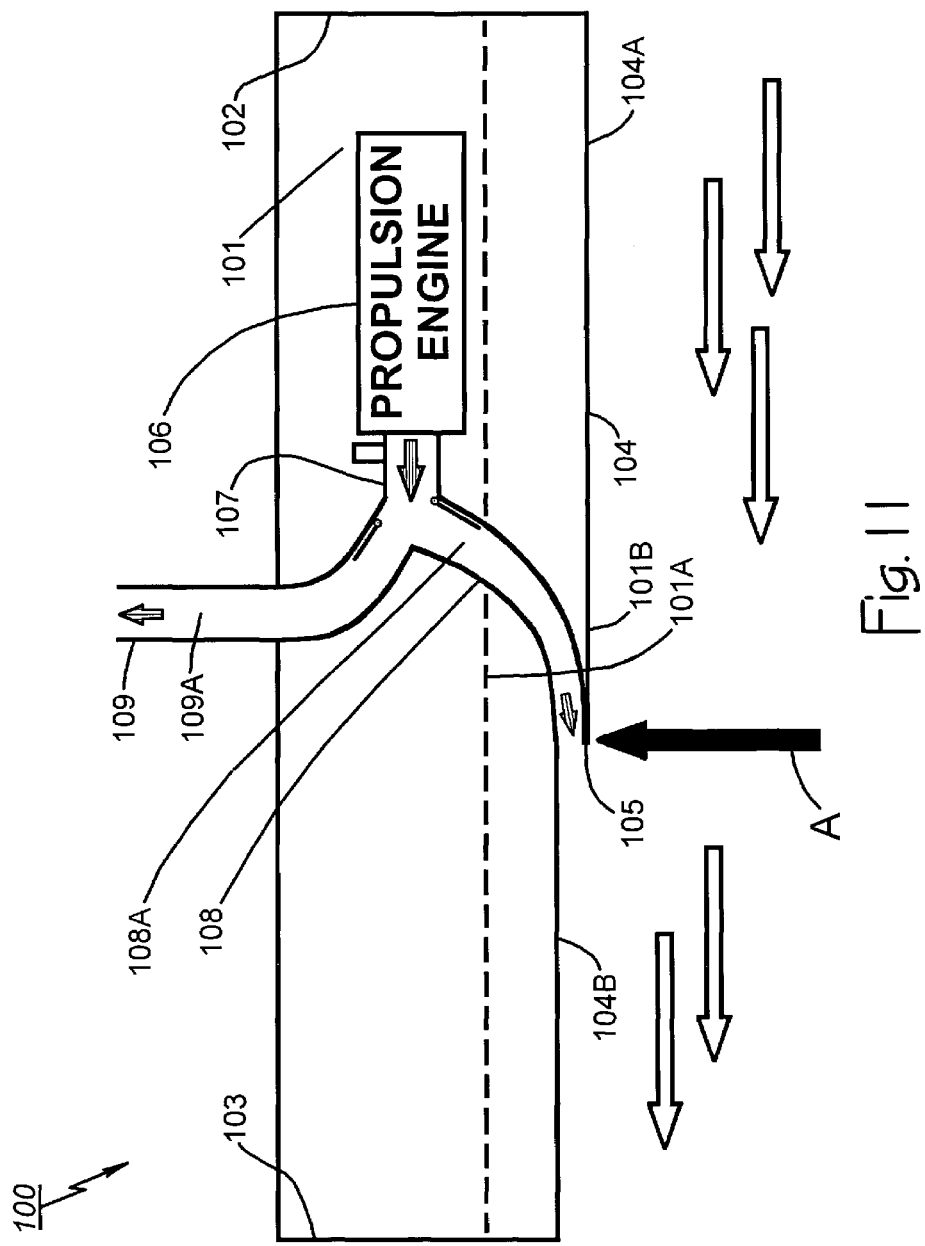
FIG. 11 is a diagrammatic elevation view of the fifth watercraft.
Figure 12:
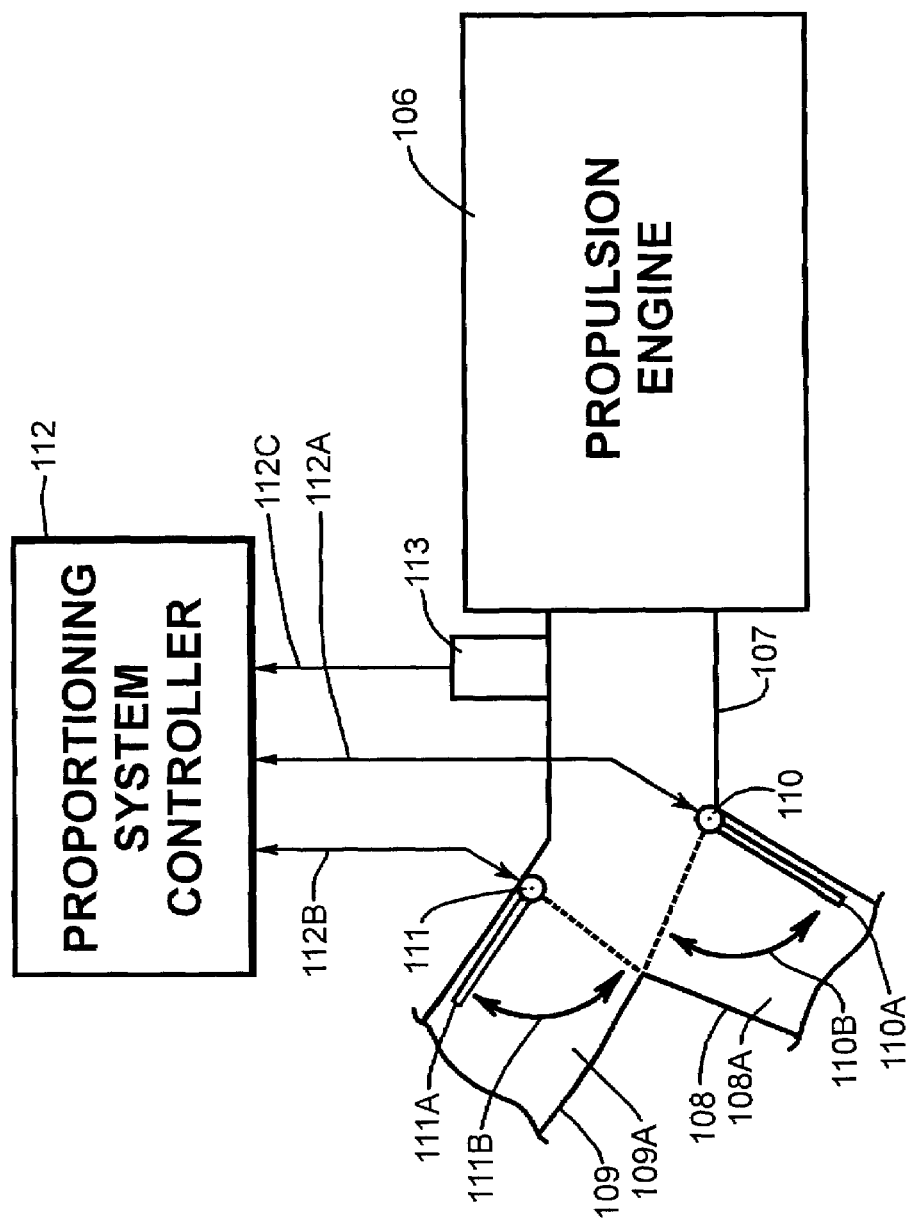
FIG. 12 is an enlarged portion of FIG. 11 showing further details of the onboard exhaust vent proportioning system.

Exhaust Proportioning System. Turning now to FIGS. 10, 11, and 12, they are diagrammatic representations of a fifth watercraft 100 constructed according to the invention to include an exhaust proportioning system. The watercraft 100 includes a hull 101 (e.g., a displacement hull) having a static water line indicated by a broken line 101A in FIG. 11. The hull 101 extends from a bow 102 of the hull 101 to a stern 103 of the hull 101 (FIGS. 10 and 11. The hull 101 includes an underside 101B (FIG. 11) that faces downwardly toward water and the underside 101B includes a planing surface 104 (FIG. 11). In addition, the watercraft 100 includes a transverse vertical step 105 in the planing surface 104 (FIGS. 10 and 11). The step 105 is disposed intermediate a forward portion 104A of the planing surface 104 and a rearward portion 104B of the planing surface 104 that are identified in FIG. 11 (e.g., located at two-thirds of the distance from the bow 102 to the stern 103).

The watercraft 100 includes a propulsion engine 106 (e.g., a gas turbine engine) that produces exhaust with an exhaust back pressure. The engine 106 discharges exhaust through an exhaust manifold 107 to first and second exhaust conduits 108 and 109 (FIGS. 10–12). The first exhaust conduit 108 defines a first exhaust flow path 108A leading to the underside 101B of the hull 101 (at the step 105 shown in FIGS. 11 and 12 for the illustrated embodiment) in order to vent a first proportion of the exhaust at the underside 101B (at the step 105), while the second exhaust conduit 109 defines a second exhaust flow path 109A to atmosphere in order to vent a second proportion of the exhaust to atmosphere. The first and second conduits 107 and 108 may include known exhaust ducting componentry.

Venting exhaust at the underside 101B of the hull 101 (e.g., at the step 105) improves operating efficiency by reducing drag. In addition, it increases lift as depicted by a bold arrow A in FIG. 11 (the outlined arrows depicting water flow across the underside of the hull and the shaded arrows depicting exhaust flow). Moreover, venting exhaust at the underside 101B (e.g., at the step 105 for the illustrated embodiment) reduces thermal signature by directing the first proportion of hot exhaust gases into water beneath the underside 101B of the hull 101 so that exhaust heat is dissipated in the water.

In order to control the first and second exhaust flow paths 108A and 109A, the watercraft 100 includes an onboard exhaust proportion system. As shown in FIG. 12, the exhaust proportioning system of the watercraft 100 includes a first valve mechanism 110 having a first valve element 110A that moves in operation as indicated in FIG. 12 by a double-headed arrow 110B. The first valve mechanism 110 serves as means for selectively restricting the first exhaust flow path 108A in order to decrease a first proportion of the exhaust flowing in the first flow path 108A and thereby direct a desired second proportion of the exhaust from the propulsion engine 106 to the second flow path 109A. It may also be use to prevent the back flow of water from the step 105 when the watercraft 100 moves astern. The exhaust proportioning system also includes a second valve mechanism 111 having a second valve element 111A that moves in operation as indicated by a double-headed arrow 111B. The second valve mechanism 111 serves as means for selectively restricting the second exhaust flow path 109A in order to decrease the second proportion of the exhaust flowing to the second flow path 109A and thereby direct the desired first proportion of the exhaust from the propulsion engine 106 to the first flow path 108A. The first and second valve mechanisms 110 and 111 may include known types of componentry for performing the described functions.

In addition to the above, the exhaust proportioning system of the watercraft 100 includes a proportioning system controller 112 and an exhaust back pressure sensor 113. The controller 112 serve as means for controlling the first valve means 110 and the second valve means 111 according to exhaust back pressure. The sensor 113 serves as means for sensing the exhaust back pressure and providing a feedback signal for the controller 112 for overall closed-loop feedback control of the first and second valve mechanisms 110 and 111 according to exhaust back pressure.

For the illustrated watercraft 100, exhaust is drawn toward the step 105 when underway by the vacuum created at the step 105 until the path of least resistance leads to atmosphere. Operating the second valve mechanism 111 forces more exhaust toward the step 105; it increases the first proportion of the exhaust that is vented at the step 105. Operating the first valve mechanism 110 forces more exhaust to atmosphere; it increases the second proportion of the exhaust that is vented to atmosphere. This is all accomplished entirely electronically in the illustrated embodiment with suitable components (e.g., a suitably programmed and outfitted laptop computer) although it is within the broader inventive concepts disclosed to use a back pressure gauge along with manual control of the valve mechanisms.

In FIG. 12, a first two-way line 112A (arrows at both ends) communicates control signals from the controller 112 to the first valve mechanism 110 together with communicating position-indicating feedback signals back to the controller 112 for closed loop feedback control of the first valve mechanism 110. Similarly, a two-way line 112B communicates control signals to the second valve mechanism 111 together with communicating position-indicating feedback signals back to the controller 112 for closed loop feedback control of the second valve mechanism 111. A one-way line 112C (an arrow at just one end) communicates back-pressure-indicating signals from the pressure sensor 113 to the controller 112 that the controller 112 processes according to preprogrammed algorithms to control the first and second valve mechanisms 110 and 111. Based upon the foregoing and subsequent descriptions, one of ordinary skill in the art can readily implement a watercraft with a dual exhaust and exhaust proportioning system according to the invention.

Figure 13:
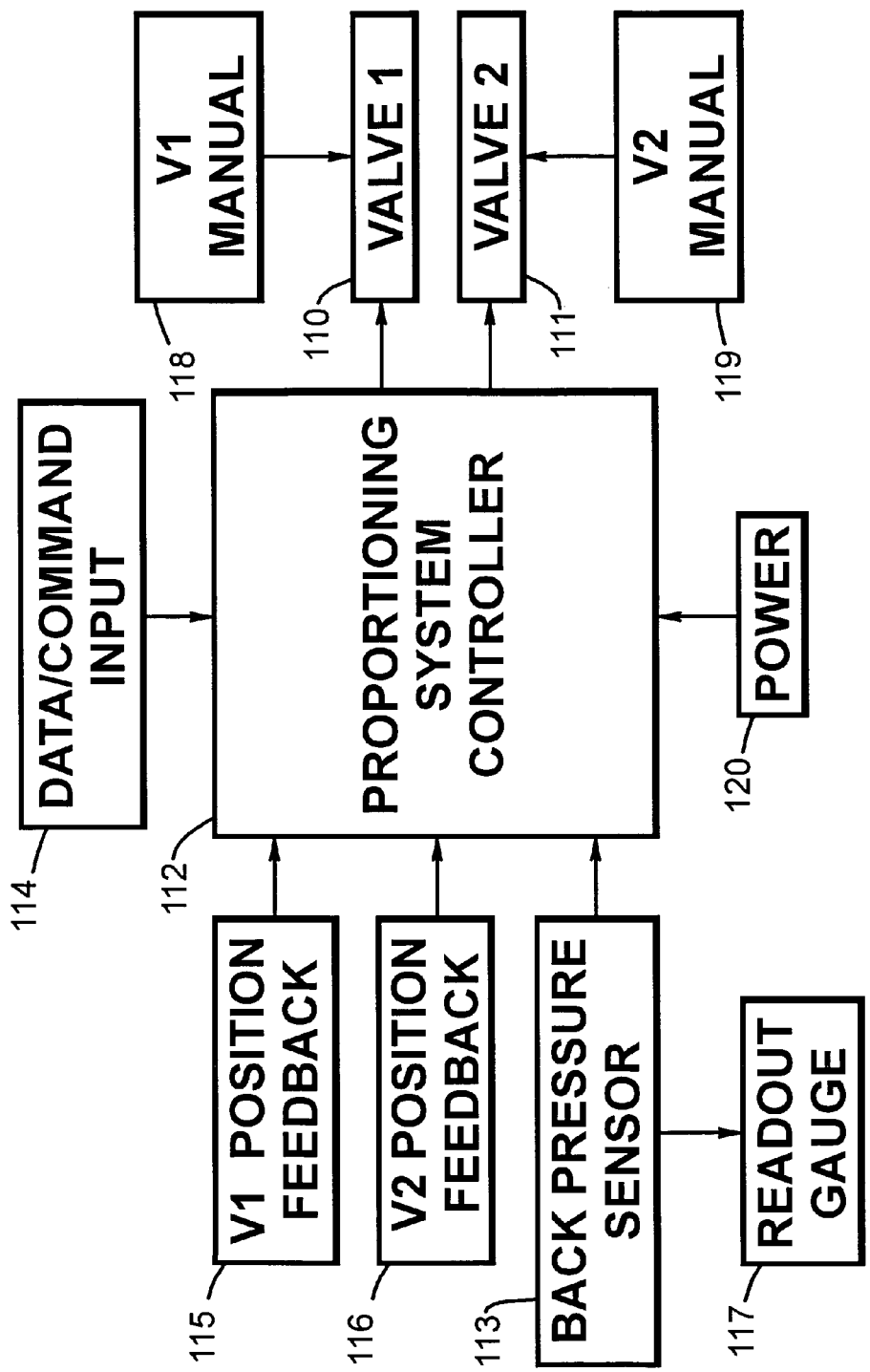
FIG. 13 is a block diagram of the onboard proportioning system with manual controls included.

Turning now to FIG. 13, it is a block diagram of the exhaust proportioning system of the watercraft 100 that shows the addition of manual controls. An input device 114 (e.g., a computer keyboard) enables operator input of data and commands to the controller 112. A first valve position feedback component 115 provides valve-position-indicating signals for the first valve mechanism 110 and a second valve-position feedback component 116 provides valve-position-indicating signals for the second valve mechanism 111. A pressure-readout component 117 (e.g., a gauge) provides a visually discernible indication of back pressure, while first and second manual valve actuators 118 and 119 enable an operator to actuate respective ones of the first and second valve mechanisms 110 and 111 when desired. Suitable power components 120 provide power to the system.

The objective of this dual exhaust duct system is to direct the highest proportion of total engine exhaust into the first exhaust conduit 108 so that engine exhaust can be used effectively to benefit vessel performance. The exhaust flowing into the first exhaust conduit 108 breaks the vacuum at the vertical step 105 that is created by forward motion of the vessel. In addition, it provides lubrication and reduced friction drag on the planing surface 104, and it generates steam for vessel lift.

A portion of the total exhaust will flow naturally into the first exhaust conduit 108 as required to break the vacuum at the vertical step 105 (self proportioning); that vacuum increases with vessel speed. This reduces the engine back-pressure below the maximum acceptable level for engine performance. Thus, additional exhaust can be directed into the first exhaust conduit 108 by closing down on the second valve mechanism 111. Doing so increases the engine back-pressure and results in a greater volume of exhaust moving through the first exhaust conduit 108. Operating the second valve mechanism 111 with regard for the level of back-pressure sensed by the sensor 113, prevents an increase in the back-pressure from this action to a level adversely affecting engine performance.

One way to configure the invention is to structure the first valve mechanism 110 as a flapper-type valve to perform two separate functions. Activated manually or automatically based on vessel speed or other factor, it controls exhausting into the water in order to avoid overheating of the hull 101 when the vessel 100 is not moving forward. Activated by reverse water flow, it prevents engine damage when the vessel is moving astern. As an alternative, a separate and supplemental flapper-type valve (not shown) may be mounted at the entry to the first exhaust conduit 108 at the underside of the hull 101.

In terms of the methodology employed, the invention provides a method for reducing the thermal signature of a watercraft having a hull with an underside and an onboard propulsion engine that produces exhaust. The method includes the step of providing a first exhaust conduit for venting a first proportion of the exhaust at the underside of the hull, a second exhaust conduit for venting a second proportion of the exhaust to atmosphere, and, preferably, an onboard exhaust proportioning system for varying the first and second proportions according to exhaust back pressure. The method proceeds by (i) venting a first proportion of the exhaust through the first exhaust conduit at the underside of the hull (ii) venting a second proportion of the exhaust through the second exhaust conduit to atmosphere, and, preferably, (iii) varying the first and second proportions with the exhaust proportioning system to maintain a desired level of exhaust back pressure.

Thus, the invention provides a watercraft with a dual exhaust and, in one embodiment, an onboard exhaust proportioning system. The dual exhaust vents exhaust to the underside of the hull and to atmosphere while the exhaust proportioning system varies the proportion of total exhaust vented at each of those locations, preferably according to exhaust back pressure. Doing so maintains back pressure and heating at an acceptable level with improved efficiency and reduced thermal signature.

What is claimed is:

1. A watercraft, comprising:
   at least one hull having at least one planing surface;
   at least one vertical step in the planing surface;
   an onboard propulsion engine; and
   means for venting exhaust from the onboard propulsion engine at the vertical step in the planing surface while under way in order to introduce gas along the planing surface;
   said means for venting exhaust including means for venting a first proportion of the exhaust at the vertical step in the planing surface, including a first exhaust conduit that defines a first exhaust flow path leading to the vertical step in the planing surface; and
   said means for venting exhaust including means for venting a second proportion of the exhaust to atmosphere, including a second exhaust conduit that defines a second exhaust flow path leading to atmosphere;
   wherein the onboard propulsion engine is not an internal combustion engine with multiple cylinders exhausting through a corresponding number of exhaust ports at the underside.

2. A watercraft, comprising:
   a hull having a fore end, an aft end, and a longitudinal axis extending between the fore end and the aft end;
   a displacement body portion of the hull that extends between the fore end and the aft end, the displacement body having a static waterline, a port side, and a starboard side;
   a first channel-defining structure portion of the hull that is located on the port side of the displacement body, including a first wing structure extending laterally from the port side of the displacement body above the static waterline and a first outer skirt structure that extends downwardly from the first wing structure to below the static waterline in spaced apart relationship to the displacement body, said first outer skirt structure having an outer surface that is substantially perpendicular with respect to the static waterline and said first channel-defining structure defining a first channel with a cross-sectional surface that is generally arcuate; and
   a second channel-defining structure portion of the hull that is located on the starboard side of the displacement body, including a second wing structure extending laterally from the starboard side of the displacement body above the static waterline and a second outer skirt structure extending perpendicularly downwardly from the second wing structure to below the static waterline in spaced apart relationship to the displacement body, said second outer skirt structure having an outer surface that is substantially perpendicular with respect to the static waterline and said second channel-defining structure defining a second channel with a cross-sectional surface that is generally arcuate;

the first and second channels extending from the fore end to the aft end and the first and second channels being adapted to capture a bow wave and to cause air and water to mix and spiral toward the aft end of the hull as compressed aerated water, thereby reducing friction drag, increasing lateral stability, and dampening transmission of bow wave energy at the aft end of the hull; and the hull including at least one planing surface, at least one vertical step in the planing surface, an onboard propulsion engine, and means for venting exhaust from the onboard propulsion engine at the vertical step in the planing surface while under way in order to introduce gas along the planing surface;

said means for venting exhaust including means for venting a first proportion of the exhaust at the vertical step in the planing surface, including a first exhaust conduit that defines a first exhaust flow path leading to the vertical step in the planing surface; and said means for venting exhaust including means for venting a second proportion of the exhaust to atmosphere, including a second exhaust conduit that defines a second exhaust flow path leading to atmosphere.

3. A watercraft, comprising:

at least one hull having an underside;

an onboard propulsion engine that produces exhaust;

means for venting a first proportion of the exhaust at the underside of the hull, including a first exhaust conduit that defines a first exhaust flow path leading to the underside; and means for venting a second proportion of the exhaust to atmosphere, including a second exhaust conduit that defines a second exhaust flow path leading to atmosphere;

wherein the onboard propulsion engine is not an internal combustion engine with multiple cylinders exhausting through a corresponding number of exhaust ports at the underside; and wherein the first exhaust flow path does not include a plurality of injection nozzles at the underside through which the exhaust must pass.

4. A watercraft, comprising:

at least one hull having an underside;

an onboard propulsion engine that produces exhaust;

means for venting a first proportion of the exhaust at the underside of the hull, including a first exhaust conduit that defines a first exhaust flow Path leading to the underside;

means for venting a second proportion of the exhaust to atmosphere; including a second exhaust conduit that defines a second exhaust flow path leading to atmosphere; and means for varying the first and second proportions of the exhaust, including an onboard proportioning system for varying the first and second proportions according to exhaust back pressure.

5. A watercraft as recited in claim 4, wherein:

the onboard proportioning system includes first valve means for restricting the first exhaust flow path in order to direct a desired portion of the exhaust from the propulsion engine to the second flow path;

the onboard proportioning system includes controller means for controlling the first valve means; and the controller means is adapted to control the first valve means according to exhaust back pressure.

6. A watercraft as recited in claim 4, wherein:

the watercraft includes second valve means for restricting the second exhaust flow path in order to direct a desired portion of the exhaust from the propulsion engine to the first flow path;

the onboard proportioning system includes controller means for controlling the second valve means; and the controller means is adapted to control the second valve means according to exhaust back pressure.

7. A watercraft as recited in claim 4, wherein:

the watercraft includes first valve means for restricting the first exhaust flow path in order to direct a desired portion of the exhaust from the propulsion engine to the second flow path;

the watercraft includes second valve means for restricting the second exhaust flow path, including a second valve mechanism in the second exhaust flow path;

the onboard proportioning system includes controller means for controlling the first valve means and the second valve means; and the controller means is adapted to control the first valve means and the second valve means according to exhaust back pressure.

8. A watercraft as recited in claim 4, wherein the onboard proportioning system includes means for sensing exhaust back pressure, including a back-pressure-sensing component.

9. A watercraft as recited in claim 8, wherein:

the watercraft includes first valve means for restricting the first exhaust flow path in order to direct a desired portion of the exhaust from the propulsion engine to the second flow path;

the onboard proportioning system includes controller means for controlling the first valve means; and the controller means is adapted to control the first valve means according to exhaust back pressure sensed by the back-pressure-sensing component.

10. A watercraft as recited in claim 8, wherein:

the watercraft includes second valve means for restricting the second exhaust flow path in order to direct a desired portion of the exhaust from the propulsion engine to the first flow path;

the onboard proportioning system includes controller means for controlling the second valve means; and the controller means is adapted to control the second valve means according to exhaust back pressure sensed by the back-pressure-sensing component.

11. A watercraft as recited in claim 8, wherein:

the watercraft includes first valve means for restricting the first exhaust flow path in order to direct a desired portion of the exhaust from the propulsion engine to the second flow path;

the watercraft includes second valve means for restricting the second exhaust flow path in order to direct a desired portion of the exhaust from the propulsion engine to the first flow path;

the onboard proportioning system includes controller means for controlling the first valve means and the second valve means; and the controller means is adapted to control the first valve means and the second valve means according to exhaust back pressure sensed by the back-pressure-sensing component.

12. A watercraft as recited in claim 4, wherein:
the hull includes at least one planing surface and at least one vertical step in the planing surface; and
the first exhaust conduit leads to the step in the planing surface.

13. A watercraft, comprising:
at least one hull having at least one planing surface and at least one vertical step in the planing surface;
an onboard propulsion engine that produces exhaust;
means for venting a first proportion of the exhaust at the vertical step in the planing surface, including a first exhaust conduit that defines a first exhaust flow path leading to the vertical step in the planing surface;
means for venting a second proportion of the exhaust to atmosphere, including a second exhaust conduit that defines a second exhaust flow path leading to atmosphere; and
means for varying the first and second proportions of the exhaust, including an onboard proportioning system for varying the first and second proportions according to exhaust back pressure.

14. A watercraft as recited in claim 13, wherein:
the onboard proportioning system includes first valve means for restricting the first exhaust flow path in order to direct a desired portion of the exhaust from the propulsion engine to the second flow path;
the onboard proportioning system includes controller means for controlling the first valve means; and
the controller means is adapted to control the first valve means according to exhaust back pressure.

15. A watercraft as recited in claim 13, wherein:
the watercraft includes second valve means for restricting the second exhaust flow path in order to direct a desired portion of the exhaust from the propulsion engine to the first flow path;
the onboard proportioning system includes controller means for controlling the second valve means; and
the controller means is adapted to control the second valve means according to exhaust back pressure.

16. A watercraft as recited in claim 13, wherein:
the watercraft includes first valve means for restricting the first exhaust flow path in order to direct a desired portion of the exhaust from the propulsion engine to the second flow path;
the watercraft includes second valve means for restricting the second exhaust flow path, including a second valve mechanism in the second exhaust flow path;
the onboard proportioning system includes controller means for controlling the first valve means and the second valve means; and
the controller means is adapted to control both the first valve means and the second valve means according to exhaust back pressure.

17. A watercraft as recited in claim 13, wherein the onboard proportioning system includes means for sensing exhaust back pressure, including a back-pressure-sensing component.

18. A watercraft as recited in claim 17, wherein:
the watercraft includes first valve means for restricting the first exhaust flow path in order to direct a desired portion of the exhaust from the propulsion engine to the second flow path;
the onboard proportioning system includes controller means for controlling the first valve means; and
the controller means is adapted to control the first valve means according to exhaust back pressure sensed by the back-pressure-sensing component.

19. A watercraft as recited in claim 17, wherein:
the watercraft includes second valve means for restricting the second exhaust flow path in order to direct a desired portion of the exhaust from the propulsion engine to the first flow path;
the onboard proportioning system includes controller means for controlling the second valve means; and
the controller means is adapted to control the second valve means according to exhaust back pressure sensed by the back-pressure-sensing component.

20. A watercraft as recited in claim 17, wherein:
the watercraft includes first valve means for restricting the first exhaust flow path in order to direct a desired portion of the exhaust from the propulsion engine to the second flow path;
the watercraft includes second valve means for restricting the second exhaust flow path in order to direct a desired portion of the exhaust from the propulsion engine to the first flow path;
the onboard proportioning system includes controller means for controlling the first valve means and the second valve means; and
the controller means is adapted to control both the first valve means and the second valve means according to exhaust back pressure sensed by the back-pressure-sensing component.

21. A watercraft, comprising:
at least one hull having an underside;
an onboard propulsion engine that produces exhaust;
means for venting a first proportion of the exhaust at the underside of the hull, including a first exhaust conduit that defines a first exhaust flow path leading to the underside;
means for venting a second proportion of the exhaust to atmosphere, including a second exhaust conduit that defines a second exhaust flow path leading to atmosphere;
means for sensing exhaust back pressure; and
means for varying the first and second proportions of the exhaust according to exhaust back pressure, including at least one valve mechanism adapted to control the flow of exhaust through at least one of the first and second exhaust conduits;
wherein the onboard propulsion engine is not an internal combustion engine with multiple cylinders exhausting through a corresponding number of exhaust ports at the underside.

22. A watercraft as recited in claim 21, wherein the means for varying the first and second proportions of the exhaust includes at least a first valve mechanism adapted to control the flow of exhaust through the first exhaust conduit.

23. A watercraft as recited in claim 22, wherein the first valve mechanism is a flapper-type valve.

24. A watercraft as recited in claim 21, wherein the means for varying the first and second proportions of the exhaust includes at least a second valve mechanism adapted to control the flow of exhaust through the second exhaust conduit.

25. A method for reducing the thermal signature of a watercraft having a hull with an underside and an onboard propulsion engine that produces exhaust, the method comprising:
- providing a first exhaust conduit for venting a first proportion of the exhaust at the underside of the hull, and a second exhaust conduit for venting a second proportion of the exhaust to atmosphere;
- venting a first proportion of the exhaust through the first exhaust conduit at the underside of the hull;
- venting a second proportion of the exhaust through the second exhaust conduit to atmosphere;
- sensing exhaust back pressure; and
- varying the first and second proportions according to exhaust back pressure.

* * * * *